United States Patent [19]

Wood

[11] Patent Number: 5,144,863
[45] Date of Patent: Sep. 8, 1992

[54] COMPOUND CHANGE GEAR TRANSMISSION

[75] Inventor: Frank R. Wood, Littleborough, England

[73] Assignee: Eaton Corporation, Cleveland, Ohio

[21] Appl. No.: 739,044

[22] Filed: Aug. 1, 1991

[51] Int. Cl.$^5$ .............................................. F16H 3/02
[52] U.S. Cl. ......................................... 74/745; 74/335
[58] Field of Search ................................. 74/335, 745

[56] References Cited

U.S. PATENT DOCUMENTS

| | | | |
|---|---|---|---|
| 2,245,501 | 6/1941 | Richardson | 103/46 |
| 3,648,546 | 3/1972 | McNamara et al. | 74/745 |
| 3,664,470 | 5/1972 | Beech et al. | 74/335 X |
| 4,005,598 | 2/1977 | Ehmann et al. | 72/391 |
| 4,261,216 | 4/1981 | Brann | 74/335 X |
| 4,455,883 | 6/1984 | Radcliffe | 74/475 |
| 4,555,959 | 12/1985 | Brann | 74/335 X |
| 4,735,109 | 4/1988 | Richards et al. | 74/745 |
| 4,748,863 | 6/1988 | McNinch, Jr. | 74/335 |
| 4,788,875 | 12/1988 | Genise | 74/335 X |
| 4,901,600 | 2/1990 | Wilson | 74/745 |
| 5,000,060 | 3/1991 | Reynolds et al. | 74/745 |
| 5,012,725 | 5/1991 | Leary | 74/335 X |
| 5,044,216 | 9/1991 | Steeby et al. | 74/335 |

*Primary Examiner*—Dirk Wright
*Attorney, Agent, or Firm*—A. E. Chrow

[57] ABSTRACT

Provided is an improved multi-speed compound change gear transmission having an auxiliary section (14) that includes a conventional single fluid chambered splitter gear piston assembly (46) for selectively coupling either a range gear (6) to an output shaft or a splitter range gear (62) to an input shaft of section (14). Section (14) also includes a range piston assembly (48) for selectively coupling a splitter gear (78) or the splitter range gear (62) to the input shaft. Assembly (48) features a pair of tandem fluid chambers (66 and 68) that enable a reduction in the diameter of the fluid chambers from the diameter of the singular chambered piston chamber heretofore used so that at least range piston assembly (48) is able to be protectively enclosed by an auxiliary section housing (50).

3 Claims, 2 Drawing Sheets

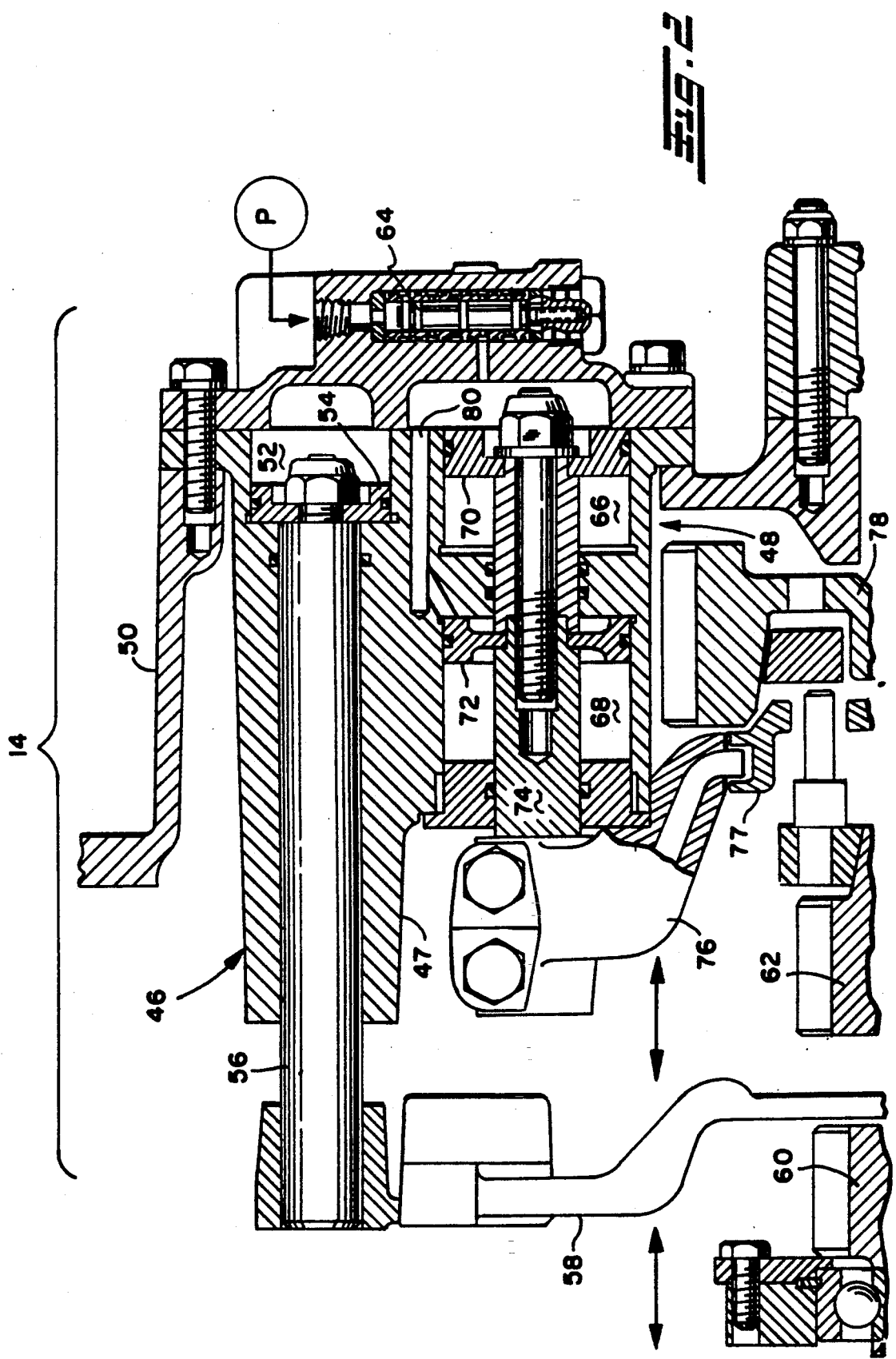

COMPOUND CHANGE GEAR TRANSMISSION

INTRODUCTION

This invention relates generally to an improved combined splitter and range type compound change gear transmission comprising a multiple speed main transmission section connected in series with an auxiliary transmission section and more particularly to such auxiliary section having a housing able to protectively enclose a range piston assembly for selectively moving a range or clutch assembly between first and second change gear positions by reason of the range piston assembly having diminished size resulting from the employment of a plurality of tandem pressurized fluid chambers therewithin able to provide sufficient force for moving the range clutch assembly.

BACKGROUND OF THE INVENTION

Compound transmission systems comprising multi-speed main transmission sections connected in series with one or more multi-speed auxiliary transmissions sections, usually the range, splitter, or a combined range/splitter type are well known in the prior art. The auxiliary sections are usually input and/or output auxiliary transmission sections but may also be multi-speed drive axles, transfer cases or the like. Examples of such compound systems may be seen by reference to U.S. Pat. Nos. 3,648,546; 3,799,022; 4,455,883; 4,527,497; 4,754,655; 4,901,600 and 5,000,060, the disclosures of which are incorporated herein by reference.

The auxiliary transmission sections commonly employ actuating devices for effecting the particular change gear ratio desired by selectively moving range clutch assemblies and/or splitter clutch assemblies between first and second positions commonly by means of fluid operated range piston assemblies and fluid operated splitter piston assemblies mounted on the auxiliary section housing.

In many instances, a comparatively large force is required to selectively move the range clutch assembly between the two positions to effect the particular change gear ratio desired. In such instances, as the regulated/filtered on-board air pressure is usually limited to pressurization (usually 60-80 psi), it has been heretofore necessary to mount the range piston assembly on the exterior of the auxiliary section housing because of the large diameter pressurized fluid chamber required to provide the necessary force against the piston head. As such, the exterior mounting of the range piston assembly exposes it to contamination and potential damage as well as requiring an opening in the housing itself to enable operative connection to the range clutch assembly.

The present invention solves the exposure problem by replacing the conventional singular pressurized fluid chamber piston assembly heretofor used with a range piston assembly of diminished size able to fit within and be protectively enclosed by the auxiliary section housing by employing a plurality of tandem pressurized fluid chambers cumulatively able to provide the amount of force required to selectively move the range clutch assembly between the first and second positions.

Tandem fluid operated pistons have been known for many years as a means of magnifying force available from a singular pressurized fluid pressure source. Examples of such can be seen in U.S. Pat. Nos. 2,245,501 and 4,005,598, the disclosures of which are incorporated herein by reference. The present invention however, employs such knowledge not to magnify a given force, but rather to provide a reduction in size yet able to provide substantially the same force heretofor required to selectively move the range clutch assembly between the first and second positions.

BRIEF DESCRIPTION OF THE DRAWINGS

FIG. 2 s a central cross-sectional view through an embodiment of a combination of a splitter piston assembly 46 and an embodiment of a range piston assembly 48 of the invention for use with transmission 100 of FIG. 1.

DESCRIPTION OF SOME PREFERRED EMBODIMENTS

Figure 1:
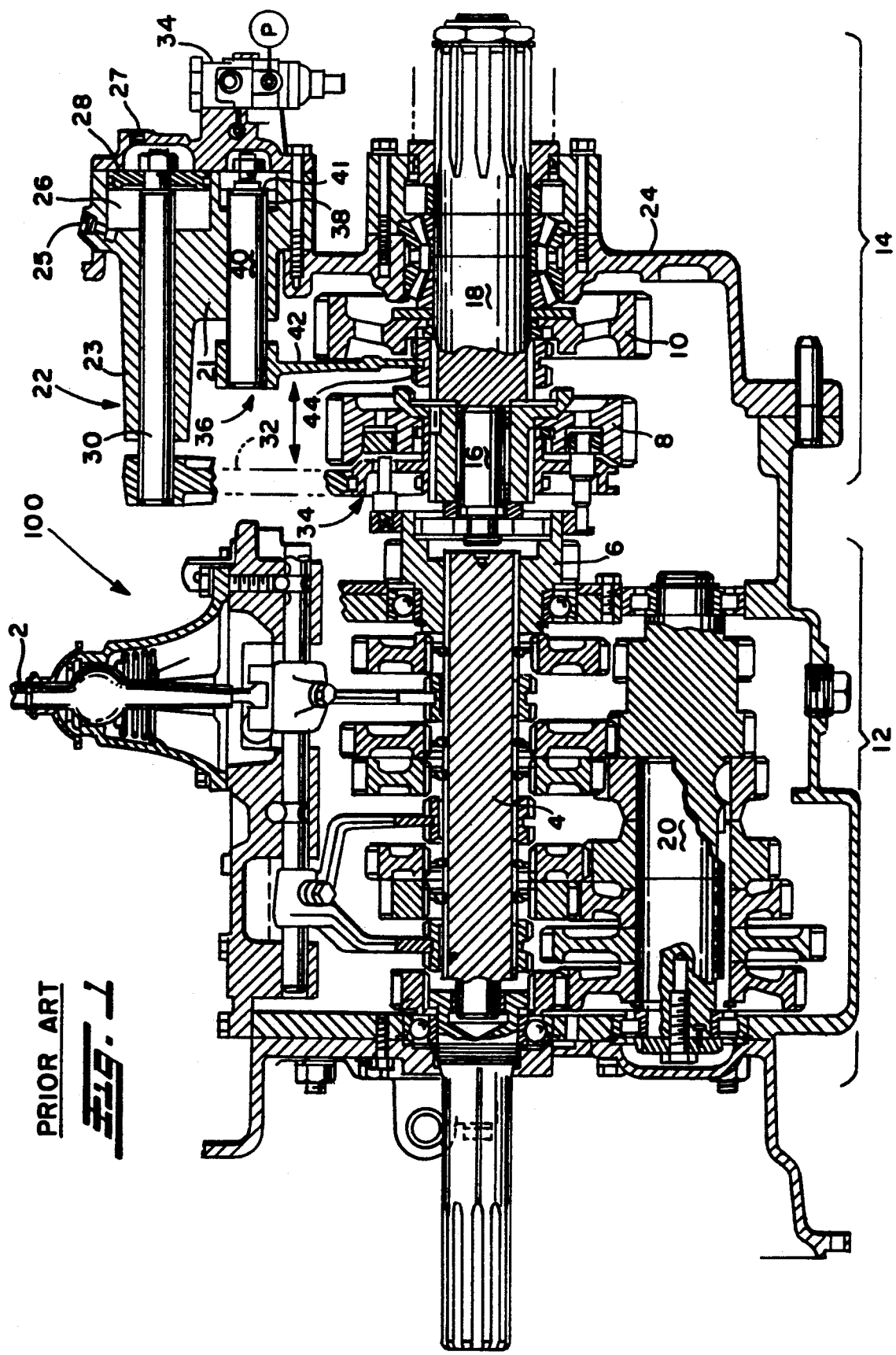
FIG. 1 is a central cross-sectional view through a prior art compound change gear transmission 100.

Compound change gear transmission 100 of FIG. 1 has a main multi-speed transmission section 12 connected in series with a multi-speed auxiliary section 14. The gears (not referenced) in main section 12 are selectively engaged by pivotal movement of lever 2 to provide mainshaft 4 with a desired rotational output speed.

Auxiliary section 14 has an input shaft 16 and an output shaft 18 that are rotationally supported on auxiliary section housing 24 in general coaxial alignment with mainshaft 4 which drivingly rotates splitter gear 6 mounted on its output end as shown in FIG. 1.

A range gear 8 is disposed coaxially about input shaft 16 and a range gear 10 is disposed coaxially about output shaft 18. Both gears 8 and 10 meshingly engage with respective gears secured to a countershaft within auxiliary section 14 that functions in the manner of countershaft 20 of main section 12 well known to those skilled in the art of countershaft transmissions but which is not shown in FIG. 1 for the sake of simplicity.

Auxiliary section 14 has a range piston assembly 22 comprising a housing containing a singular pressurized fluid chamber 26 in which a piston head 28 is reciprocally movable and from which extends piston rod 30 that in turn has a range yoke 32 attached transversely to its end that is operatively connected to a range clutch assembly 34. Chamber 26 is selectively filled with pressurized fluid, most commonly air, through valve 34 that receives the pressurized fluid from a suitable pressurized fluid source "P" such as a compressed air accumulator or an on-board compressor suitably regulated. Range piston assembly 22 includes vents such as referenced by numerals 25 and 27 to prevent fluid from being compressed on the back side of the piston and may include biasing means such as return springs or the like to move the piston in the opposite direction when the fluid pressure is being exhausted from chamber 26. Selective pressurization of chamber 26 operates to cause range yoke 32 to move range clutch assembly either to the viewer's left to couple splitter gear 6 to input shaft 16 or towards the viewer's right to couple splitter range gear 8 to input shaft 16.

Auxiliary section 14 also includes splitter piston assembly 36 that may be separate from range piston assembly 22 but preferably is contained within a common housing 23 such that they share a common housing or cylinder wall 21. Splitter piston assembly 36 has a pressurized fluid chamber 38 that selectively receives Pressurized fluid from source "P" through valve 34 as previously described. Splitter piston assembly 36 includes a piston head 48 reciprocally movable within pressurized fluid chamber 38. A piston rod 40 extends from head 41 and moves reciprocally within housing 23 in unison with piston head 38. A splitter yoke 42 is secured transversely to the end of piston 40 and is operatively connected to splitter clutch assembly 44. Reciprocal movement of piston rod 40 causes yoke 42 to move splitter clutch assembly 44 toward the viewer's left to couple splitter range gear 8 to input shaft 16 and towards the viewer's right to couple splitter gear 10 to output shaft 18. Thus, gear ratio variations available from auxiliary section 14 can be controlled by selective positioning of range clutch assembly 34 and splitter clutch assembly 42.

It will be noted that chamber 26 of range piston assembly 22 has a substantially larger diameter (not referenced) than the diameter of chamber 38 of splitter piston assembly 36 due to the characteristically greater force required to move range clutch assembly in the manner hereinbefore described. It is because of the required diameter size for a singular fluid chambered piston that range piston assembly 22 has heretofor been required in many instances to be mounted on the exterior of auxiliary section housing 24 with range yoke 32 extending through an opening in housing 24 in order to operatively connect with range clutch assembly 34.

In many instances, particularly where the splitter and range piston assemblies share a common housing or cylinder wall, the splitter piston assembly is also mounted to the exterior of housing 24.

A preferred embodiment of the means by which to reduce the size of the range piston assembly sufficiently to enable it to be protectively enclosed by the auxiliary section housing is shown in FIG. 2 in which the position of the splitter piston assembly and the splitter piston assembly relative the auxiliary transmission section gears is the reverse and viewed from the opposite side of the view shown in FIG. 1 but which indicates the principle of the invention involved.

Splitter piston assembly 46 in FIG. 2 has a conventional singular pressurized fluid chamber 52 in which piston head 54 is reciprocally movable and from which piston rod 56 extends. Splitter yoke 58 extends transversely from piston rod 56 and is operatively connected to the splitter clutch assembly (not shown) so as to selectively couple splitter gear 60 to the input shaft or splitter range gear 62 to the output shaft of the auxiliary transmission section. Fluid chamber 52 receives pressurized fluid such as air from a suitably regulated pressurized fluid source "P" through valve 64 as previously described.

Range piston assembly 48 however has a pair of tandem pressurized fluid chambers 66 and 68 in which piston heads 70 and 72 are respectively reciprocally movable and from which extend a singular piston rod 74 that may comprise one or more sections.

Pressurized fluid is received into chamber 66 from pressurized fluid source "P" through valve 64 and into chamber .68 through fluid passageway 80 such that both chambers 66 and 68 are pressurized simultaneously. Ports for suitably venting the opposite sides of the cylinder hands expand to the pressurized fluid are not shown in FIG. 2. Likewise, biasing means such as springs for moving the piston heads in an opposite direction to the direction resulting from introduction of pressurized fluid into chambers 66 and 68 may be employed but are not shown in FIG. 2. Clearly, an alternative method for moving the piston heads of either or both the splitter piston assembly and the range piston assembly in to introduce the Pressurized fluid into the chamber on either side of the piston head which exhausting the fluid pressure on the opposite side of the piston head.

A range yoke 76 extends transversely from piston rod 74 and is operatively connected with range clutch assembly 77 so as to selectively couple either range gear 78 or splitter range gear 62 to the input shaft (not shown) of the auxiliary transmission section.

The use of two tandem fluid chambers 66 and 68 has enabled the area of piston heads 70 and 72 to be reduced to about one-half of the area of the singular chamber range piston head 28 shown in FIG. 1 resulting in substantial diminishing of the size (diameter) of the range piston assembly fluid chamber bores yet able to provide at least the same force for the same level of fluid pressure or provide for the singular chambered piston.

An even further reduction in size can be achieved by employing one or more additional fluid chambers in tandem with fluid chambers 66 and 68 where desired.

Likewise, although splitter piston assembly 46 and range piston assembly 48 may be physically separate from each other, they preferably are positioned adjacent each other and share a common housing or cylinder wall such as wall 47 shown in FIG. 2.

The reduction in diameter of chambers 66 and 68 need not be but are preferably the same as long as the result enables the range piston assembly and preferably both the splitter piston assembly and the range changer piston assembly to be protectively enclosed by the auxiliary housing 50 as shown in FIG. 2 and yet able to provide at sufficient force to move the range clutch assembly between the first and second positions.

What is claimed is:

1. An improved combined splitter and range type compound change gear transmission comprising a multiple speed main transmission section connected in series with an auxiliary transmission section, said main transmission section having a mainshaft for rotationally driving a splitter gear that is rotationally supported on a main transmission section housing, said auxiliary section having a input shaft and an output shaft that are rotationally supported on a auxiliary section housing that is connectable to the main transmission section housing, said input shaft having a splitter range gear disposed coaxially thereabout and said output shaft having a range gear disposed coaxially thereabout, a splitter clutch assembly fixed for rotation with said input shaft and selectively movable by a fluid position for coupling the splitter gear to the input shaft and a second piston for coupling the splitter range gear to the input shaft, and a range clutch assembly fixed for rotation with the output shaft and selectively movable b a fluid operated range piston assembly between a first position for coupling the splitter range gear to the input shaft and a second position for coupling the range gear to the output shaft, wherein the improvement is characterized by said range piston assembly being protectively enclosed by the auxiliary section housing by reason of having diminished size resulting from the employment of a plurality of individual simultaneously fluid pressurized chambers disposed in tandem therewithin that respectively contain a piston head connected to a common piston rod that is operative to provide the amount of force necessary to move the range clutch assembly between the first and second pistons upon simultaneous delivery of pressurized fluid into the chambers.

2. The transmission of claim 1 wherein both the range piston assembly and the splitter piston assembly are protectively enclosed by the auxiliary section housing.

3. The transmission of claim 2 wherein the range piston assembly and the splitter piston assembly share a common cylinder wall.

* * * * *